(12) United States Patent
Jacobson et al.

(10) Patent No.: US 7,725,654 B2
(45) Date of Patent: May 25, 2010

(54) AFFECTING A CACHING ALGORITHM USED BY A CACHE OF STORAGE SYSTEM

(75) Inventors: Michael B. Jacobson, Boise, ID (US); David R. Eagleton, Boise, ID (US); Douglas L. Hagerman, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 11/492,350

(22) Filed: Jul. 25, 2006

(65) Prior Publication Data

US 2008/0028147 A1    Jan. 31, 2008

(51) Int. Cl.
G06F 12/00   (2006.01)
(52) U.S. Cl. .................. 711/118; 711/137; 711/213; 711/E12.076
(58) Field of Classification Search .................. None
See application file for complete search history.

(56) References Cited

U.S. PATENT DOCUMENTS

| 5,197,146 | A | 3/1993 | LaFetra |
| 6,460,115 | B1 | 10/2002 | Kahle et al. |
| 6,721,856 | B1 | 4/2004 | Arimilli et al. |
| 2003/0188045 | A1 | 10/2003 | Jacobson |
| 2004/0034746 | A1* | 2/2004 | Horn et al. .................. 711/141 |
| 2004/0068636 | A1 | 4/2004 | Jacobson et al. |
| 2005/0216678 | A1 | 9/2005 | Jeddeloh |

OTHER PUBLICATIONS

S. Frolund et al., "FAB: enterprise storage systems on a shoestring," Proceedings of HotOS IX: The 9th Workshop on Hot Topics in Operating Systems, pp. 169-174 (May 18-21, 2003).

* cited by examiner

*Primary Examiner*—Reginald G Bragdon
*Assistant Examiner*—Thanh D Vo

(57) ABSTRACT

A storage system includes plural storage units having respective storage controllers and associated caches. A first one of the storage units further includes an internal workload generator to initiate a data operation with respect to at least one destination storage unit, where the data operation is associated with tag information to affect a caching algorithm used by the cache of the at least one destination storage unit. The at least one destination storage unit includes at least one of the plural storage units.

21 Claims, 3 Drawing Sheets

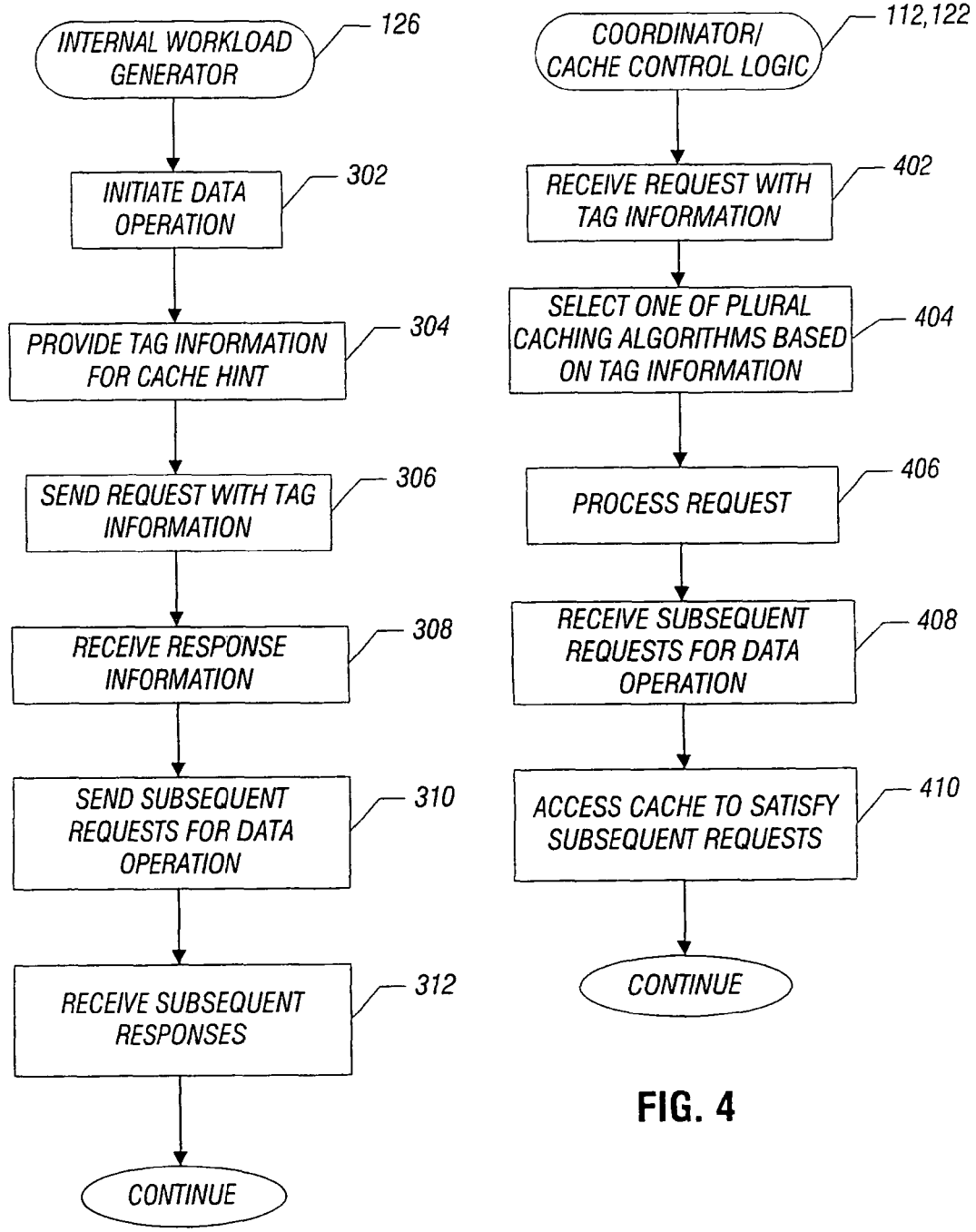

AFFECTING A CACHING ALGORITHM USED BY A CACHE OF STORAGE SYSTEM

BACKGROUND

Increasingly, to store large amounts of data, distributed storage systems are provided. Distributed storage systems can be implemented with a storage area network (SAN). Hosts (such as file servers, database servers, client computers, and so forth) coupled to a SAN are able to perform data operations (such as read and write operations) with respect to storage devices (e.g., disk-based storage devices, tape-based storage devices, storage library systems, etc.) coupled to the SAN. Other forms of distributed storage systems are also available, such as storage array systems that have multiple nodes containing respective sets of storage devices.

The throughput of a storage system is determined by access speeds of the storage devices in the storage system, communications speeds of links interconnecting the storage devices, and efficiency in retrieving and writing data from and to storage devices. If insufficient throughput is provided by a storage system, then a host may experience delays when performing data operations with respect to the storage system.

BRIEF DESCRIPTION OF THE DRAWINGS

Some embodiments of the invention are described with respect to the following figures:

FIG. 3 is a flow diagram of a process performed by an internal workload generator in the distributed storage system of FIG. 1, according to an embodiment; and FIG. 4 is a flow diagram of a process performed by a coordinator and/or cache control logic in the distributed storage system of FIG. 1, according to an embodiment.

DETAILED DESCRIPTION

Figure 1:
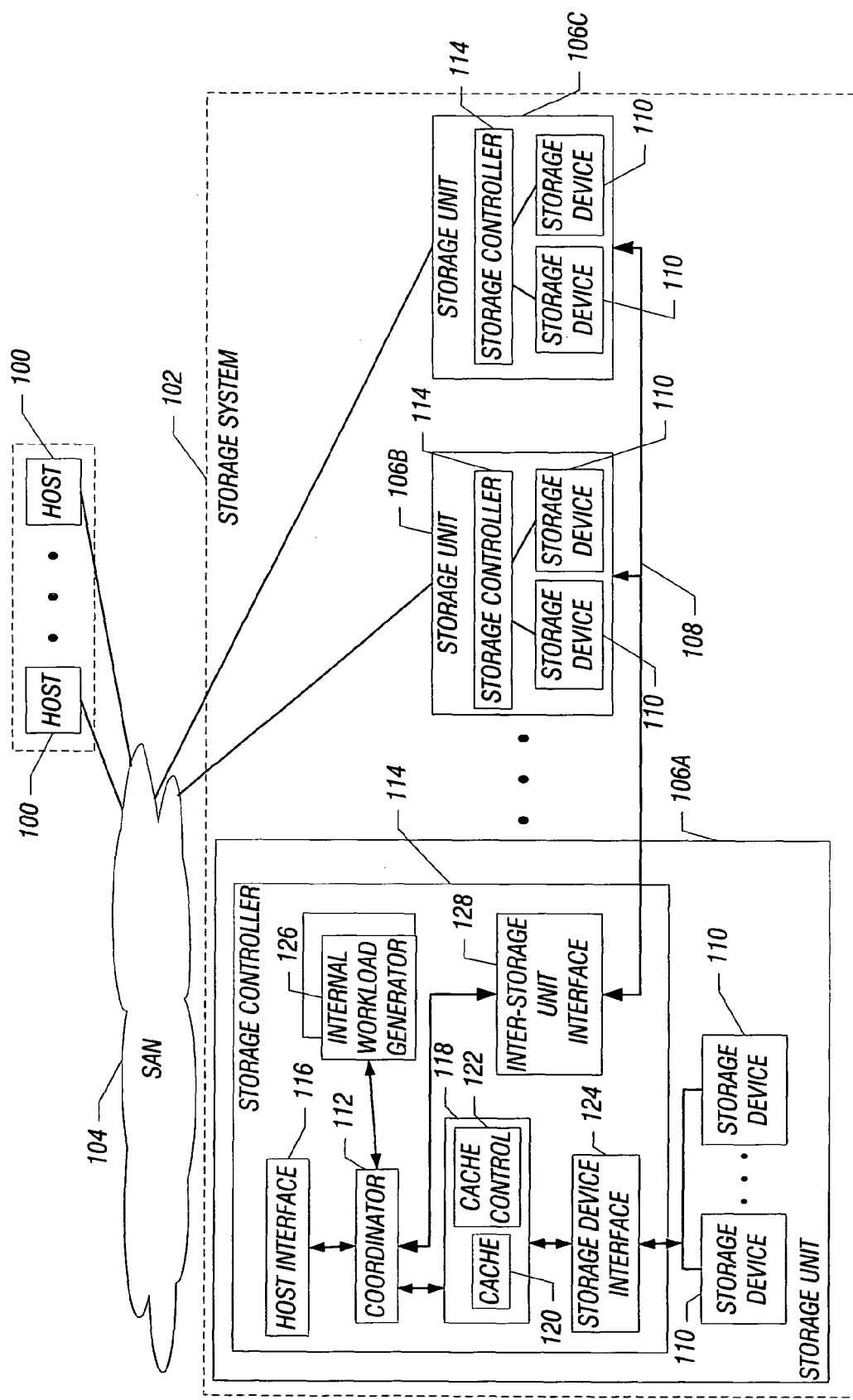
FIG. 1 is a block diagram of a distributed storage system according to an embodiment, which distributed storage system is accessible by external hosts over a network.

FIG. 1 is a block diagram of an example arrangement that includes hosts 100 (e.g., file servers, database servers, web servers, client computers, and so forth) that are coupled to a storage system 102 over a storage area network (SAN) 104. The SAN 104 can be implemented with a Fibre Channel networking technology. In other implementations, the SAN 104 can be implemented with other communications technologies. Also, instead of a SAN 104, the hosts 100 can be coupled to the storage system 102 over other types of networks. In some cases, the storage system 102 can even be directly attached to a corresponding host.

The storage system 102 according to some embodiments is a distributed storage system having multiple storage units 106 (106A, 106B, 106C depicted in FIG. 1). The storage units 106 are connected to an inter-storage unit communications link 108. The communications link 108 can be implemented using various different types of protocols (whether public or proprietary). For example, the communications link 108 can be based on the Transmission Control Protocol/Internet Protocol (TCP/IP) protocol, in which communications are accomplished with TCP/IP packets.

Each storage unit 106 includes one or plural storage devices 110, where examples of the storage devices 110 include magnetic storage devices (such as hard disk drives), optical storage devices (such as optical drives), semiconductor storage devices, and so forth.

The storage system 102 in the implementation depicted in FIG. 1 has a decentralized architecture (in which a central management node is not employed) so that a host 100 can issue a request to any one of the storage units 106 in the storage system 102. In fact, multiple hosts can issue requests concurrently to multiple storage units 106 in the distributed storage system 102.

Coordinators 112 in respective storage units 106 are able to coordinate among themselves to provide logical volumes that are accessible by hosts 100 connected to the SAN 104. A logical volume refers to some logical collection of data, which logical collection of data can be stored within storage devices 110 of one storage unit 106, or alternatively, can be distributed across storage devices of multiple storage units 106.

Although the described embodiments are in the context of the example architecture depicted in FIG. 1, it is noted that other embodiments can employ different architectures for the storage system 102.

The coordinator 112 is located in a storage controller 114 of a corresponding storage unit 106. The storage controller 114 can be implemented with hardware only or with a combination of hardware and software, where the hardware includes processors, interface circuitry, and so forth, and the software is executable on the processor. Each storage unit 106 has a corresponding storage controller 114. In FIG. 1, the details of the storage controller 114 in the storage unit 106A are depicted. The storage controllers 114 in the other storage units 106B, 106C can have identical components.

The storage controller 114 also includes a host interface 116 for interfacing the storage controller 114 in the corresponding storage unit 106 to the SAN 104. Requests and data associated with data operations between a host 100 and a storage unit are communicated through the SAN 104 and the respective host interface 116.

The coordinator 112 in the storage controller 114 is able to receive requests from either an external requester (such as a host 100) or an internal requester (such as an internal workload generator 126). From the perspective of the storage system 102, the hosts 100 are considered "external" hosts, in that the hosts 100 are located external to the storage system 102. Thus, the term "external host" is used herein to refer to any requester that is located outside the storage system. An external host is contrasted with an internal workload generator, which is a requester located within the storage system 102.

The storage controller 114 further includes an inter-storage unit interface 128 to enable communication among the storage controllers 114 of corresponding storage units 106. The inter-storage unit interfaces 128 of the storage controllers 114 are coupled to the inter-storage unit communications link 108.

In addition, the storage controller 114 includes a cache subsystem 118, which includes a cache 120 and cache control logic 122. The cache control logic 122 performs control operations with respect to the cache 120. The cache 120 is a relatively high-speed storage device, such as a static random access memory (SRAM), dynamic random access memory (DRAM), synchronous DRAM (SDRAM), and so forth.

The cache subsystem 118 is connected to a storage device interface 124, which in turn is connected to the storage devices 110. In response to requests from a requester (e.g., external host 100 or internal workload generator 126), the coordinator 112 issues requests to the cache subsystem 118 to determine whether the requests can be satisfied from the cache 120. If not, the storage devices 110 are accessed through the storage device interface 124 to retrieve data (or to write data to) the storage devices 110.

As depicted in FIG. 1, the storage controller 114 includes multiple internal workload generators 126. Generally, each internal workload generator includes logic (whether implemented in hardware, software, or a combination of both) to perform certain operations with respect to data stored in the storage system 102. An internal workload generator 126 can issue a request to the coordinator of the storage unit 106 in which the internal workload generator 126 is located, or alternatively, the internal workload generator 126 can issue a request to a coordinator of another storage unit. Thus, for example, an internal workload generator 126 in the storage unit 106A can perform a data operation with respect to data contained in storage devices 110 in the storage unit 106A, or alternatively, the internal workload generator 126 can perform a data operation over the inter-storage unit communications link 108 with respect to one or more other storage units, such as storage units 106B, 106C.

One example of an internal workload generator 126 is a rebuild generator, which is able to rebuild data of a defective storage device using data stored in other storage devices. Rebuilding of data is possible when a redundancy scheme is employed, such as a RAID (Redundant Array of Independent Disks) scheme. There are various different levels of RAID, with the different RAID levels defining different redundancy schemes. For example, RAID 1 defines a redundancy scheme in which an exact copy (or mirror) of a set of data is provided on two or more storage devices. With certain other RAID levels, data is striped across multiple storage devices, with parity information stored in one or more of the storage devices (depending on which type of RAID level is used) to enable reconstruction of data should any of the storage devices fail. The reconstruction of data from the parity information is referred to as "rebuilding." In the arrangement depicted in FIG. 1, data stripes can be stored in storage devices distributed across multiple storage units 106. Thus, in such a scenario, to rebuild data, an internal workload generator 126 would have to retrieve data in the local storage device (s) and in remote storage device(s) 110 on other storage unit(s). A rebuild operation is considered an internal process of the storage system 102.

Another example internal workload generator is one that is able to balance data across multiple storage devices. For example, when a new storage device comes on line in the storage system 102, an internal balance process can be performed by one or more of the internal workload generators 126 to balance data across the multiple storage devices, including the new storage device.

Another internal process that can be performed by an internal workload generator 126 is a drain process, in which data of a particular storage unit 106 is migrated off the storage unit to another location (such as another storage unit or other storage units) in preparation for removal of the particular storage unit. Additional examples of internal processes that can be performed by internal workload generators 126 include various migration tasks, in which data can be migrated to different storage devices or to different storage units, or data can be migrated to storage devices that use a different RAID level.

Although reference has been made to storage devices in the discussion of the various internal processes above, it is noted that the internal processes can apply equally to storage units 106.

The specific internal processes discussed above are provided for the purpose of example. In other implementations, other internal processes can also be performed by respective internal workload generators 126.

In accordance with some embodiments, to improve performance of the storage system 102 when an internal process is performed, an internal workload generator 126 can provide hints with a data operation submitted to a corresponding coordinator (whether a local coordinator or a remote coordinator) to affect a caching algorithm used by the cache subsystem 118 (either the local cache subsystem or the remote cache subsystem). A local coordinator or local cache subsystem is a coordinator or cache subsystem that resides in the same storage unit as the internal workload generator that issued the request. A remote coordinator or remote cache subsystem is a coordinator or cache subsystem that resides in a storage unit different from the storage unit of the internal workload generator that issued the request.

The hint provided with the data operation can be in the form of information tagged to one or more requests of the data operation. The tag includes information that is useful for selection of a caching algorithm to apply to the data operation. Examples of tag information include information uniquely identifying the source of the data operation (for example, each internal workload generator can be associated with a different identifier), information specifying which caching algorithm to apply, information about future data operations that are anticipated to be generated by the source, and other information.

Using the tag information (also referred to as a cache hint), the corresponding cache control logic can select the proper caching algorithm to use with respect to the cache associated with the cache control logic. For example, the caching algorithm may involve prefetching additional sequential blocks of data, which may be useful when a data operation is a stream of sequential reads or sequential writes. As another example, the cache can be used to hold write data associated with several write operations, where the write operations involve a sequential collection of data. The cache can be used to merge the write data associated with the multiple data operations, where the merged write data can be written to storage devices as a group for enhanced efficiency.

As another example, a rebuild process can involve stripes of data stored in different storage arrangements. To rebuild a stripe of data associated with a defective storage device, the rebuild process makes a read request to each of the storage units containing blocks of data that are used for rebuilding the stripe associated with the defective storage device. The rebuild process tends to involve reading of multiple sequential blocks of data. If an appropriate cache hint were provided with requests associated with the rebuild process, then prefetching would have been performed by cache control logic in corresponding storage units that are involved in the rebuild process. Subsequent read requests for successive blocks can then be satisfied from respective caches in corresponding storage units, which would improve the speed at which the rebuild process is completed.

As yet another example, another caching algorithm can be selected where some amount of data is removed from the cache after the data has been read or written because it is known by the internal process that the data will not be read or written again. Removing the data frees up the cache for other data so that cache performance can be improved. This technique can be useful in situations where read-ahead data (data that was previously prefetched) has already been retrieved by the internal process, and where it is unlikely that the internal process will retrieve the read-ahead data again. In another scenario, after merged data has been written from the cache back to the storage devices 110, the merged data can be removed from the cache since the write-back has occurred.

Another exemplary caching algorithm is one where an entire page of data (where a "page" can be some predefined collection of data of a certain size) is read into the cache because the internal process expects that there will be many small scattered reads of data in the page. A similar technique can be applied in the write scenario, where a page of data is stored in the cache to enable an internal process to perform scattered writes to the page.

In other implementations, other example caching algorithms can be implemented according to behaviors of specific internal processes. The cache hint mechanism provided by some embodiments allows any of such caching algorithms to be utilized by providing the proper tag information with requests submitted in the internal processes.

Improving performance for internal processes generally improves the overall performance of the storage system. Note that internal processes such as rebuild processes, balance processes, drain processes, and migration processes tend to involve relatively large amounts of data, so that use of caches for executing such internal processes can be quite beneficial. Improved performance of the storage system enables the storage system to respond more quickly to requests from external hosts.

Figure 2:
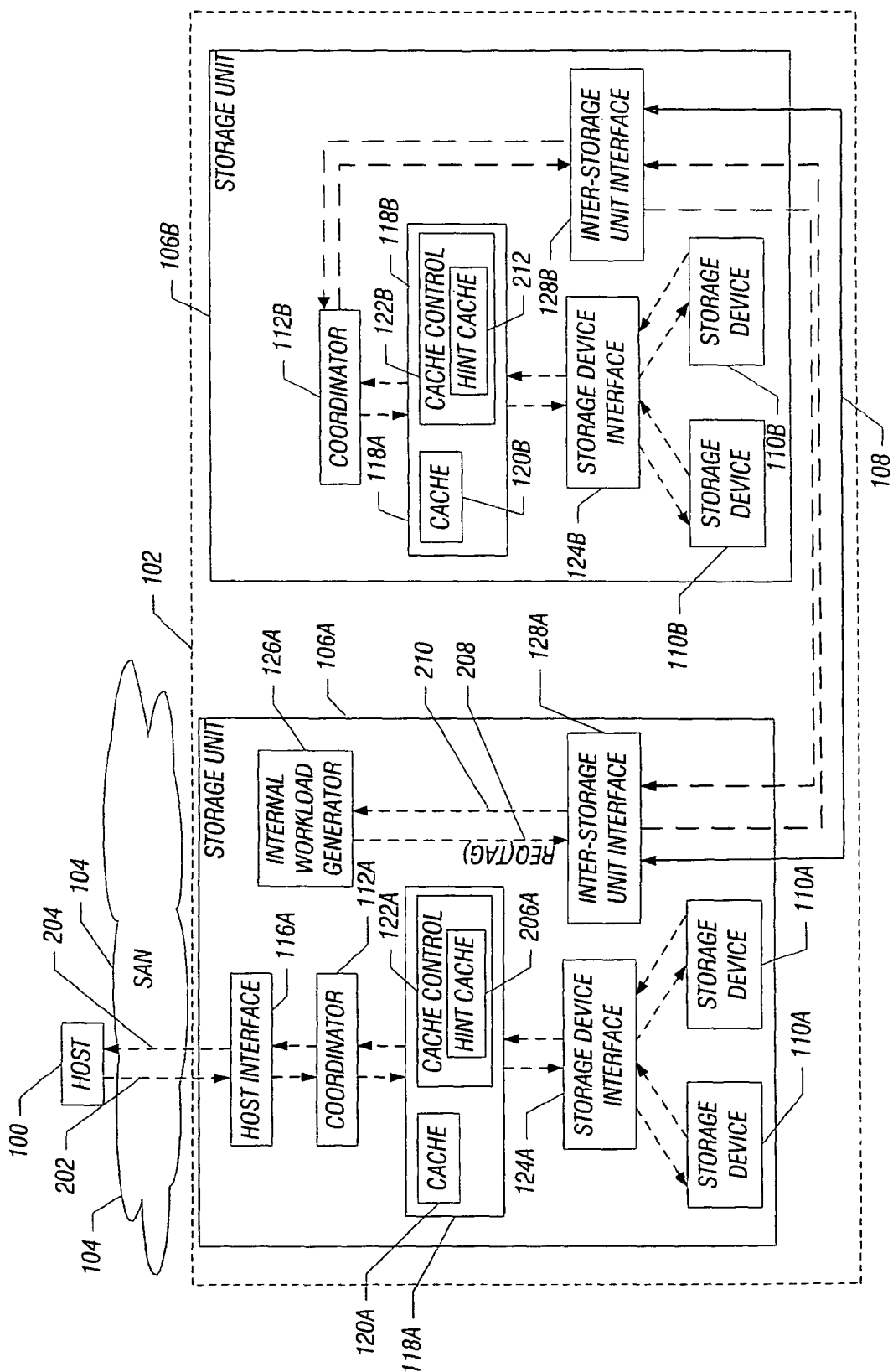
FIG. 2 illustrates example flows of requests and data for data operations with respect to the distributed storage system of FIG. 1, in accordance with an embodiment.

FIG. 2 illustrates example data operations that can be initiated either by an external host 100 or an internal workload generator 126. In the example of FIG. 2, it is assumed that storage unit 106A and storage unit 106B are involved in the illustrated data operations.

In an external host-initiated data operation, the external host 100 sends (at 202) a request (a read request or write request, for example) to the storage unit 106A over the SAN 104. The request is received by the host interface 116A in storage unit 106A, which request is then forwarded to the coordinator 112A. The coordinator 112A, in response, issues a request to the cache subsystem 118A to determine whether the cache 120A can satisfy the request. If so, data is retrieved from the cache 120A and provided back through the coordinator 112A, host interface 116A, and SAN 104 to the host 100.

However, if the request cannot be satisfied from the cache 120A, a request is submitted to storage devices 110A through storage device interface 124A. The storage devices 110A then return data (for read requests) and/or status indications (collectively referred to as "response information") back through the storage device interface 124A to the cache subsystem 118A for storage in the cache 120A. The cache subsystem 118A then sends the requested data back through the coordinator 112A, host interface 116A, SAN 104, to the host 100 (at 204).

Note that the request from the external host received by the storage unit 106A can also be forwarded to a remote storage unit, such as storage unit 106B, if the request involves a storage device on the remote storage unit.

Alternatively, a request can be issued by an internal workload generator 126A to perform an internal process. The request by the internal workload generator 126A can either be sent to the local coordinator 112A (coordinator in the storage unit 106A in which the internal workload generator 126A is located) and/or to a remote coordinator, such as coordinator 112B in storage unit 106B. In the example of FIG. 2, the request sent by the internal workload generator 126A is a request 208 that is sent to the remote coordinator 112B.

In the depicted embodiment, the request (208) generated by the internal workload generator 208 is represented as REQ(TAG), where the request represents a command associated with the particular request (which can be a read request, write request, or other requests). TAG represents the tag information, which can be carried in the request, or associated with the request. Note that the internal process performed by the internal workload generator 126A may involve multiple requests. Not all requests are associated with the tag information. The tag information can be generated by the internal workload generator 126A to submit with the request.

The request 208 is sent through the inter-storage unit interface 128A and over the inter-storage unit link 108. This request is received by the inter-storage unit interface 128B in the storage unit 106B, which request is then forwarded to the coordinator 112B. The coordinator 112B responds by sending a request to the cache subsystem 118B in the storage unit 106B.

If the request can be satisfied with the cache 120B, then the storage devices 110B do not have to be accessed. On the other hand, if the request cannot be satisfied by the cache subsystem 118B, then a request is submitted through the storage device interface 124B to the storage devices 110B.

Response information (in the form of read data and/or status information) from the storage devices is stored in the cache 120B. The data that is responsive to the request from the internal workload generator 126A is then provided from the coordinator 112B back through the inter-storage unit interface 128B, inter-storage unit communications link 108, and the inter-storage unit interface 128A to the internal workload generator 126A (at 210).

Upon receipt of the request with the tag information, the cache control logic 122B in the cache subsystem 118B uses the tag information to select the appropriate caching algorithm. For example, the tag information can simply specify the behavior for the cache control logic 122B, such as specifying the number of data blocks to prefetch. Alternatively, the tag information can indicate the type of operation associated with the request. For example, the tag information can indicate that the request is a sequential read request or sequential write request that is reading sequential blocks of data. In response to this type of request, the cache control logic 122B can react by prefetching additional blocks of data for the anticipated future requests for the additional blocks.

The cache control logic 122B can also include a hint cache 212 (similar to hint cache 206 in storage unit 106A) that stores hints that can be used by the cache control logic 122B to determine the caching algorithm to use given the tag information. For example, the tag information can simply identify a source of the request. Multiple internal workload generators can be associated with multiple identifiers. Given a specific identifier, the hint cache 212 can retrieve information indicating the type of internal workload generator associated with that identifier. The cache control logic 122B can use this pre-stored information in the hint cache 212 to affect the caching algorithm for the cache 120B. For example, the hint cache 212 can store a mapping table that maps identifiers of internal workload generators to corresponding caching algorithms to be used.

In some cases, the tag information provided with a request from the internal workload generator can be stored in the hint cache 212 for later use by the cache control logic 122B for similar requests or for other requests associated with the same internal workload generator 126A. There are other possible ways of implementing cache hints for affecting the caching algorithm used by the cache subsystem 118B. In other implementations, the hint cache 206B can be omitted. A hint cache 206A in the cache control logic 122A in the storage unit 106A can be similarly provided.

FIG. 3 is a flow diagram of a process performed by an internal workload generator 126 according to an embodiment. The internal workload generator 126 initiates (at 302) a data operation, and provides (at 304) tag information for a cache hint to affect selection of a caching algorithm. Providing tag information refers to either generating the tag information by the internal workload generator, or retrieving or receiving the tag information by the internal workload generator. A request with the tag information is sent (at 306) to one or more coordinators associated with destination storage units 106. Response information (e.g., read data, status information) is received (at 308) from the destination storage units.

A "destination" storage unit refers to a storage unit that is involved in a particular data operation (e.g., rebuild operation, balance operation, drain operation, migration operation, etc.) requested by the internal workload generator.

Next, subsequent requests for the data operation are sent (at 310) to corresponding coordinators of destination storage units. A "subsequent" request refers to any request sent by the internal workload generator after the request in which tag information is provided. Subsequent responses are received (at 312) in response to the subsequent requests.

FIG. 4 illustrates the flow diagram of a process performed by the coordinator and/or cache control logic 112, 122. The coordinator/cache control logic receives (at 402) a request with tag information (which was originated by an internal workload generator 126). One of plural caching algorithms is selected (at 404) based on the tag information and the request is processed (at 406). Processing the request includes reading or writing data from or to the storage devices of the corresponding storage unit. Processing the request also involves the cache control logic applying a selected caching algorithm (such as to prefetch data to the cache, remove data from the cache, and so forth). Subsequent requests for the data operation are received (at 408), with the subsequent requests processed by accessing (at 410) the cache to satisfy the subsequent requests, where possible. If the correct caching algorithm was selected, then the likelihood of being able to satisfy such subsequent requests from the cache is enhanced, which improves performance of the storage system 102.

Instructions of software described above (including the coordinator 112, internal workload generators 126, and cache control logic 122 in FIG. 1) are loaded for execution on a processor. The processor includes microprocessors, microcontrollers, processor modules or subsystems (including one or more microprocessors or microcontrollers), or other control or computing devices.

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage system comprising:
    plural storage units having respective storage controllers and associated caches,
    wherein at least a first one of the storage units further comprises an internal workload generator to initiate a data operation with respect to at least one destination storage unit, said data operation associated with tag information to affect a caching algorithm used by the cache of the at least one destination storage unit for said data operation,
    wherein the at least one destination storage unit includes at least one of the plural storage units.

2. The storage system of claim 1, wherein the storage units further comprise one or more storage devices, and wherein said data operation is targeted to the one or more storage devices of the destination storage unit.

3. The storage system of claim 2, wherein said data operation comprises at least one of a rebuild operation for rebuilding data of a failed storage element, a balance operation to balance data across storage elements, and a migration operation to migrate data between storage elements, wherein each storage element comprises one of a storage device and storage unit.

4. The storage system of claim 1, wherein the destination storage unit comprises a second one of the storage units, the storage system further comprising a communications link to couple the first storage unit to the second storage unit, and
    wherein the internal workload manager in the first storage unit sends a request associated with said data operation over the communications link to the second storage unit, the request containing the tag information.

5. The storage system of claim 4, wherein the second storage unit further contains cache control logic to control the cache of the second storage unit,
    wherein the cache control logic is responsive to the request containing the tag information by selecting the caching algorithm to use for the request.

6. The storage system of claim 5, wherein the cache control logic selects one of plural caching algorithms based on the tag information.

7. The storage system of claim 1, wherein the tag information comprises an identifier associated with the internal workload generator, and wherein the destination storage unit contains cache control logic to select the caching algorithm based on the identifier associated with the internal workload generator.

8. The storage system of claim 7, wherein the cache control logic of the destination storage unit stores hint information to enable the cache control logic to map the identifier to a corresponding caching algorithm.

9. The storage system of claim 1, wherein the tag information specifies a type of said data operation, and wherein the destination storage unit contains cache control logic to select the caching algorithm based on the type of said data operation.

10. The storage system of claim 1, wherein the destination storage unit contains cache control logic associated with a hint cache, the cache control logic to retrieve information from the hint cache based on the tag information to select the caching algorithm.

11. The storage system of claim 1, wherein the destination storage unit is the first storage unit, and wherein the internal workload generator is configured to send requests associated with said data operation to the first storage unit and a second one of the storage units, wherein the tag information affects the caching algorithm used by the caches of the first and second storage units.

12. The storage system of claim 1, wherein the storage units comprise respective interfaces to communicate with at least one external host.

13. The storage system of claim 12, wherein the interfaces are configured to communicate with the external host over a storage area network coupled to plural external hosts.

14. The storage system of claim 1, wherein the tag information is used for selecting the caching algorithm from among plural caching algorithms, and the tag information is selected from the group consisting of: information specifying which caching algorithm to apply, and information about future data operations that are anticipated to be generated by a source.

15. A method comprising:
providing a storage system having plural storage units, the plural storage units having respective caches;
issuing, by an internal workload generator in a first one of the storage units, a request associated with a cache hint;
sending the request with the cache hint to a destination storage unit, wherein the destination storage unit comprises one of the storage units; and
applying, by the destination storage unit with respect to the cache in the destination storage unit, a caching algorithm in accordance with the cache hint from the internal workload generator, wherein the cache hint is used for selecting the caching algorithm from among plural caching algorithms, and the cache hint is selected from the group consisting of: information specifying which caching algorithm to apply, and information about future data operations that are anticipated to be generated by a source.

16. The method of claim 15, wherein the cache of each of the storage units is sharable by data operations originated by an external host and data operations originated by the internal workload generator, the method further comprising receiving, by at least one of the storage units, a request from the external host.

17. The method of claim 15, wherein the first storage unit further has a second internal workload generator, the method further comprising:
sending, by the second internal workload generator, a second request with a cache hint to the destination storage unit; and
applying, by the destination storage unit with respect to the cache in the destination storage unit, a different caching algorithm in accordance with the cache hint from the second internal workload generator.

18. The method of claim 15, wherein sending the request comprises sending the request associated with one of a rebuild operation, a balance operation, a drain operation, and a migration operation.

19. An article comprising at least one storage medium containing instructions for use in a storage system having plural storage units, the plural storage units having respective caches, the instructions when executed causing the storage system to:
send, from an internal workload generator in a first one of the storage units, a request with tag information to a second one of the storage units; and
apply, by the second storage unit, a caching algorithm in accordance with the tag information, the caching algorithm being applied to the cache in the second storage unit, wherein the tag information is used for selecting the caching algorithm from among plural caching algorithms, and the tag information is selected from the group consisting of: information specifying which caching algorithm to apply, and information about future data operations that are anticipated to be generated by a source.

20. The article of claim 19, wherein the instructions when executed cause the storage system to further receive, by the second storage unit, a second request from an external host, the second request causing data associated with the second request to be stored in the cache of the second storage unit.

21. The article of claim 19, wherein sending the request from the internal workload generator comprise sending the request to perform one of a rebuild operation, a balance operation, a drain operation, and a migration operation on the storage system.

* * * * *

UNITED STATES PATENT AND TRADEMARK OFFICE
CERTIFICATE OF CORRECTION

PATENT NO. : 7,725,654 B2  Page 1 of 1
APPLICATION NO. : 11/492350
DATED : May 25, 2010
INVENTOR(S) : Michael B. Jacobson et al.

It is certified that error appears in the above-identified patent and that said Letters Patent is hereby corrected as shown below:

On the title page, item (54), Title, in column 1, line 2, delete "OF STORAGE" and insert -- OF A STORAGE --, therefor.

In column 1, line 2, delete "OF STORAGE" and insert -- OF A STORAGE --, therefor.

Signed and Sealed this

Sixteenth Day of November, 2010

David J. Kappos
*Director of the United States Patent and Trademark Office*